(12) United States Patent
Logsdon et al.

(10) Patent No.: US 11,912,347 B2
(45) Date of Patent: Feb. 27, 2024

(54) SYSTEM AND METHOD FOR REDUCING AERODYNAMIC DRAG FOR GROUND VEHICLES

(71) Applicant: FORE TRANSIT INC., San Francisco, CA (US)

(72) Inventors: Ryan Matthew Logsdon, Pasadena, CA (US); Radin Rahimzadeh, San Francisco, CA (US)

(73) Assignee: FORE TRANSIT INC., San Francisco, CA (US)

( * ) Notice: Subject to any disclaimer, the term of this patent is extended or adjusted under 35 U.S.C. 154(b) by 104 days.

(21) Appl. No.: 17/533,732

(22) Filed: Nov. 23, 2021

(65) Prior Publication Data

US 2022/0161873 A1 May 26, 2022

Related U.S. Application Data

(60) Provisional application No. 63/117,822, filed on Nov. 24, 2020.

(51) Int. Cl.
*B62D 35/00* (2006.01)

(52) U.S. Cl.
CPC ......... *B62D 35/001* (2013.01); *B62D 35/007* (2013.01); *B62D 35/008* (2013.01)

(58) Field of Classification Search
CPC ............... B62D 35/001; B62D 35/007; B62D 35/008; Y02T 10/82
See application file for complete search history.

(56) References Cited

U.S. PATENT DOCUMENTS

| | | | |
|---|---|---|---|
| 4,180,290 A | 12/1979 | Drews | |
| 4,284,302 A | 8/1981 | Drews | |
| 4,320,919 A | 3/1982 | Butler | |
| 4,343,506 A | 8/1982 | Saltzman | |
| 4,779,915 A * | 10/1988 | Straight | B62D 35/001 296/180.3 |
| 4,789,117 A | 12/1988 | Paterson | |
| 5,058,837 A | 10/1991 | Wheeler | |

(Continued)

FOREIGN PATENT DOCUMENTS

| | | | | |
|---|---|---|---|---|
| CN | 203511801 U | * | 4/2014 | ............. F15D 1/003 |
| JP | 6435434 B1 | * | 12/2018 | ............. B62D 35/00 |

(Continued)

OTHER PUBLICATIONS

Office Action dated Sep. 8, 2023 in corresponding U.S. Appl. No. 17/558,647.

*Primary Examiner* — Lori Lyjak
(74) *Attorney, Agent, or Firm* — NovoTechIP International PLLC (57) ABSTRACT

A method for reducing an amount of aerodynamic drag generated within a rear area of a vehicle may include attaching a plurality of devices to a surface of the vehicle, the plurality of devices being positioned such that at least two of the plurality of devices are parallel to each other, where each of the plurality of devices includes flat and tapered surface regions, the device is positioned in the rear area of the vehicle, and the at least two of the plurality of devices cause an air stream passing between the at least two of the plurality of devices to increase in speed before the air stream is turned inward to a vacuum formed behind the vehicle.

16 Claims, 9 Drawing Sheets

(56) References Cited

U.S. PATENT DOCUMENTS

| | | | |
|---|---|---|---|
| 5,108,145 A | 4/1992 | Harris | |
| 5,240,306 A | 8/1993 | Flemming | |
| 5,289,997 A | 3/1994 | Harris | |
| 5,378,524 A | 1/1995 | Blood | |
| 6,131,853 A | 10/2000 | Bauer et al. | |
| 6,224,141 B1 | 5/2001 | Brodlo | |
| 6,276,636 B1 | 8/2001 | Krastel | |
| 6,378,932 B1 * | 4/2002 | Fasel | B62D 35/007 296/180.1 |
| 6,634,700 B1 | 10/2003 | Calvert | |
| 7,192,077 B1 | 3/2007 | Hilleman | |
| 7,255,387 B2 | 8/2007 | Wood | |
| 7,357,442 B1 | 4/2008 | Drews | |
| 7,810,867 B2 | 10/2010 | Salaverry | |
| 7,922,235 B1 * | 4/2011 | Smith | B62D 35/001 296/180.1 |
| 8,579,360 B2 | 11/2013 | Litchfield | |
| RE44,755 E | 2/2014 | Surti | |
| 8,801,078 B2 | 8/2014 | Brown et al. | |
| D776,026 S | 1/2017 | Ellis | |
| 9,834,267 B1 | 12/2017 | Hanagan | |
| 10,843,746 B1 * | 11/2020 | Stinchcomb | B62D 35/001 |
| 2002/0109375 A1 * | 8/2002 | Hung | B61D 17/02 296/180.1 |
| 2003/0011210 A1 | 1/2003 | Cory | |
| 2006/0134379 A1 | 6/2006 | Pulkka | |
| 2007/0120397 A1 | 5/2007 | Layfield et al. | |
| 2007/0246969 A1 * | 10/2007 | Smith | B62D 35/001 296/180.2 |
| 2009/0230725 A1 | 9/2009 | Juieng | |
| 2010/0090496 A1 | 4/2010 | Carlson | |
| 2010/0225143 A1 * | 9/2010 | Skopic | B62D 35/001 296/180.5 |
| 2010/0301632 A1 | 12/2010 | Bryne | |
| 2011/0115254 A1 | 5/2011 | Skopic | |
| 2011/0175393 A1 | 7/2011 | Cline | |
| 2011/0175395 A1 | 7/2011 | Guigne et al. | |
| 2011/0181072 A1 * | 7/2011 | Kempster | B62D 35/001 296/180.5 |
| 2011/0204677 A1 | 8/2011 | Wood et al. | |
| 2012/0038183 A1 * | 2/2012 | Brewer | B62D 35/001 296/180.1 |
| 2012/0255152 A1 * | 10/2012 | Evans | B62D 35/00 137/899.2 |
| 2013/0228236 A1 * | 9/2013 | Evans | F15D 1/12 137/351 |
| 2014/0167447 A1 * | 6/2014 | Meredith | B62D 35/001 296/180.4 |
| 2014/0252799 A1 * | 9/2014 | Smith | B62D 35/001 296/180.4 |
| 2014/0265438 A1 | 9/2014 | Kronemeyer | |
| 2014/0375079 A1 * | 12/2014 | Evans | F15D 1/12 296/180.1 |
| 2015/0251711 A1 | 9/2015 | Carlson | |
| 2015/0370252 A1 * | 12/2015 | Hanson | B60F 5/00 701/2 |
| 2016/0016616 A1 * | 1/2016 | Bacon | B62D 35/001 296/180.4 |
| 2017/0282982 A1 | 10/2017 | Nagasawa et al. | |
| 2018/0226917 A1 | 8/2018 | Jacques | |
| 2018/0312203 A1 | 11/2018 | Smith | |
| 2020/0023911 A1 | 1/2020 | Otterstrom | |
| 2021/0094630 A1 | 4/2021 | Watanabe et al. | |
| 2021/0094633 A1 | 4/2021 | Watanabe et al. | |
| 2021/0188373 A1 * | 6/2021 | Chung | B62D 35/001 |
| 2021/0203177 A1 * | 7/2021 | Peng | B60L 53/63 |
| 2021/0231141 A1 | 7/2021 | Smith et al. | |

FOREIGN PATENT DOCUMENTS

| | | | | |
|---|---|---|---|---|
| WO | WO-2012138841 A2 * | 10/2012 | | B62D 35/00 |
| WO | WO-2019117051 A1 * | 6/2019 | | B62D 35/00 |

* cited by examiner

SYSTEM AND METHOD FOR REDUCING AERODYNAMIC DRAG FOR GROUND VEHICLES

TECHNICAL FIELD

This disclosure relates generally to reduction of aerodynamic drag for ground vehicles, and, more particularly, to a method of and system for reduction of aerodynamic drag by controlling the flow of air and the pressure gradients surrounding a moving ground vehicle.

BACKGROUND

As ground vehicles move forward while penetrating through the air, the movement creates a substantial amount of aerodynamic drag on the vehicles. As a result, a significant amount of force may be needed to overcome the drag and continue moving the vehicle forward. The amount of force exerted on overcoming the drag often results in additional fuel or energy consumption. This is particularly the case for large ground vehicles and/or those traveling at high speeds. To address this issue, a number of after-market products have been introduced over the years for reducing the amount of aerodynamic drag exerted on medium to heavy-duty trucks and other ground transportation vehicles. However, most of these devices either fall short in efficiently reducing aerodynamic drag or they suffer from other shortcomings.

One of the devices currently offered for reducing the amount of aerodynamic drag on a ground transportation vehicle is a device that facilitates the flow of air in a vortex-like manner by rotating the air around the length of the device. In some examples, this is done by creating a wall-like boundary of air. However, rotating the air around the device does little to reduce aerodynamic drag. As a result, this type of device does not significantly improve fuel efficiency.

Another common after-market product is a trailer side fairing, commonly known as a trailer side skirt, that can be attached to ground transportation vehicles such as trailers, trucks, and semi-trailers to reduce wind flow resistance and drag on such vehicles. Trailer side skirts are devices that extend downwardly from the bottom of the trailer and/or chassis toward the roadway to partially enclose the floor assembly and undercarriage. Air flow passing under a ground vehicle imparts a drag force to the vehicle when it impinges on and flows around the vehicle undercarriage components that are attached to or a part of the underside of a vehicle. Trailer side skirt systems are designed to prevent or control the flow of air from entering the undercarriage region from the side of the ground vehicle, such as a trailer of a tractor-trailer truck system. While trailer side skirts may reduce the amount of aerodynamic drag generated underneath the vehicle, they do not substantially affect the amount of aerodynamic drag behind the vehicle.

Another common device for reducing the amount of aerodynamic drag is a trailer tail, commonly referred to as a boat-tail. The boat-tail attaches to the rear face of the truck by being secured on top of the rear doors of the truck. The aerodynamic boat-tail attachments are applied to the trailer base in order to eliminate flow separation and its associated drag. These representative aerodynamic boat-tail devices, while successful in reducing flow separation, are complex devices that are typically comprised of moving parts that require maintenance. Furthermore, these products often require the driver to deploy the technology. Because drivers are not always cognizant of the benefits of these devices, they often neglect their use. Furthermore, these devices often add significant weight to the vehicle which may itself increase fuel consumption.

Hence, there is a need for improved systems and methods of efficiently reducing aerodynamic drag for a moving ground vehicle.

SUMMARY

In one general aspect, the instant disclosure presents a method for reducing an amount of aerodynamic drag generated within a rear area of a vehicle. The method includes attaching a plurality of devices to a surface of the vehicle, the plurality of devices being positioned such that at least two of the plurality of devices are parallel to each other, where each of the plurality of devices includes flat and tapered surface regions, the device is positioned in the rear area of the vehicle, and the at least two of the plurality of devices cause an air stream passing between the at least two of the plurality of devices to increase in speed before the air stream is turned inward to a vacuum formed behind the vehicle.

In another general aspect, the instant disclosure presents a system for reducing an amount of aerodynamic drag generated within a rear area of a vehicle. The system includes a plurality of devices for attaching to or manufacturing on a surface of the vehicle, each of the plurality of devices comprising flat and tapered surface portions connected via a rounded transition element, and the plurality of devices are positioned such that at least two of the plurality of devices are parallel to one another, where the device is positioned in the rear area of the vehicle, and the at least two of the plurality of devices cause an air stream passing between the at least two of the plurality of devices to increase in speed before the air stream is turned inward to a vacuum formed behind the vehicle.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Aerodynamic drag is a substantial source of fuel usage in ground vehicles. This is particularly the case for large vehicles and those moving at high speeds such as trucks and other cargo carrying vehicles. In most large vehicles, the aerodynamic drag generated around the rear end of the vehicle is the largest source of vortex shedding and as such is a substantial source of drag as the vehicle moves forward. While certain devices and improvements have been made over the years to reduce some of the aerodynamic drag on these vehicles, current devices do not adequately address the amount of drag generated around the rear end of the vehicles. Furthermore, some of the currently used devices add substantial weight to the vehicle, require maintenance and/or require the driver's involvement in deploying the device. As such, none of the currently available devices provide an easy to use, lightweight and efficient mechanism for reducing aerodynamic drag generated around the rear end of the vehicle.

To address these problems and others, in an example, this description provides a solution by providing lightweight, easy to install and easy to operate devices that reduce the amount of aerodynamic drag generated around the rear end of the vehicle. In one implementation, this is achieved by utilizing a plurality of small, thin profile devices that can be installed on the body of the vehicle such that they extend outwards from the body. These devices may be referred to herein as Aero Glider® devices. In some implementations, Aero Glider devices may force the air to pass between multiple pairs of the device, and as such alter the trailing wake flow of the vehicle. The wake flow may be changed by the air speeding up as it passes over the multiple devices, thus causing the air streams to travel further in a straight line. As a result, the air streams may travel considerably past the rear of the truck before turning inward towards the vehicle's wake. This may result in the slower moving air above and below the vehicle to curl into the wake sooner than it otherwise would and with less resistance from the side air streams. Thus, the air streams from above and below the vehicle may be able to continue this trajectory unabated and curl more directly into the rear face of the vehicle, providing an assistive push in the vehicle's direction of travel.

In some implementations, the Aero Glider devices disclosed herein may be wider in the center and/or tapered on either one or both sides so that the body of the device creates minimal turbulence in the wake at the rear face of the vehicle. The Aero Glider devices may be flat on the extended outside base of the devices. The thickness observed at the center of the devices may compress the air that passes through the pairs of neighboring devices to speed up the air and as such reduce the amount of turbulence in air. The Aero Glider devices may be mounted or manufactured individually on the surface of the vehicle or may form a connected system (e.g., a strip) that can be attached to the vehicle's surface. The strip may be an adhesive or magnetic strip for easy attachment to the body of the vehicle.

Figure 3A:
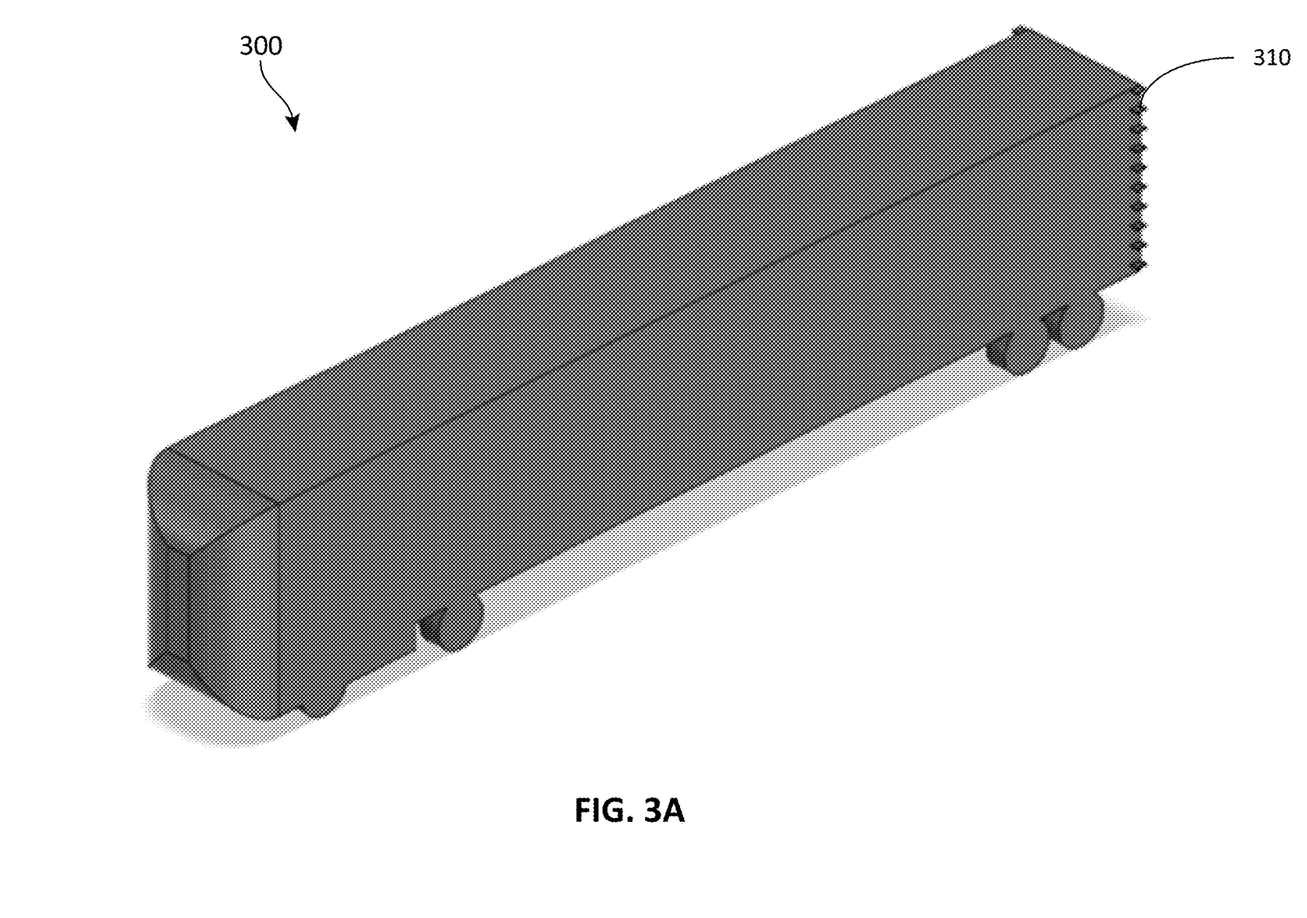
FIGS. 3A-3B depict examples of bluff bodied ground vehicles to which aero gliding devices for improving aerodynamic drag have been attached.
Figure 3B:
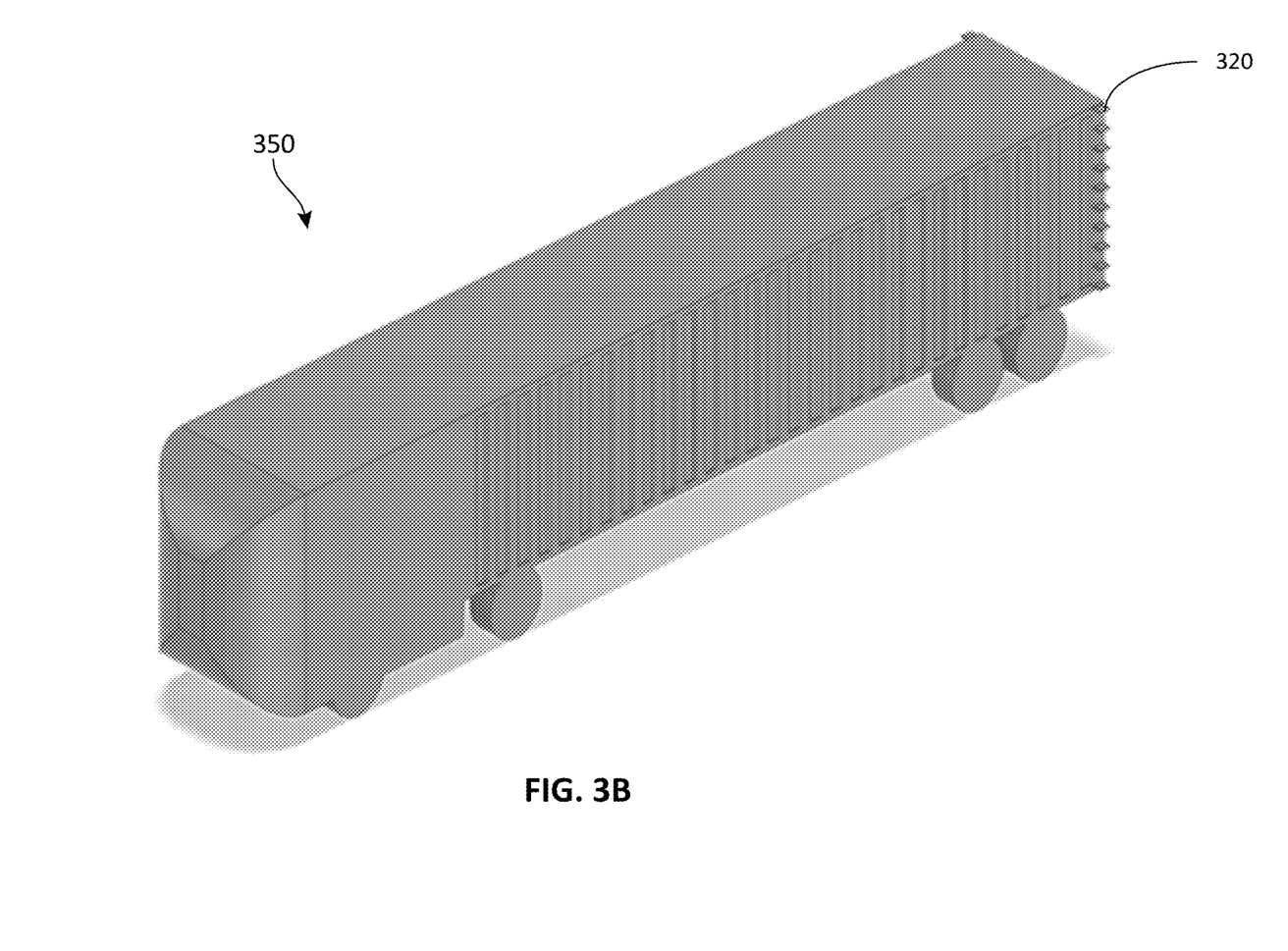
Figure 3C:
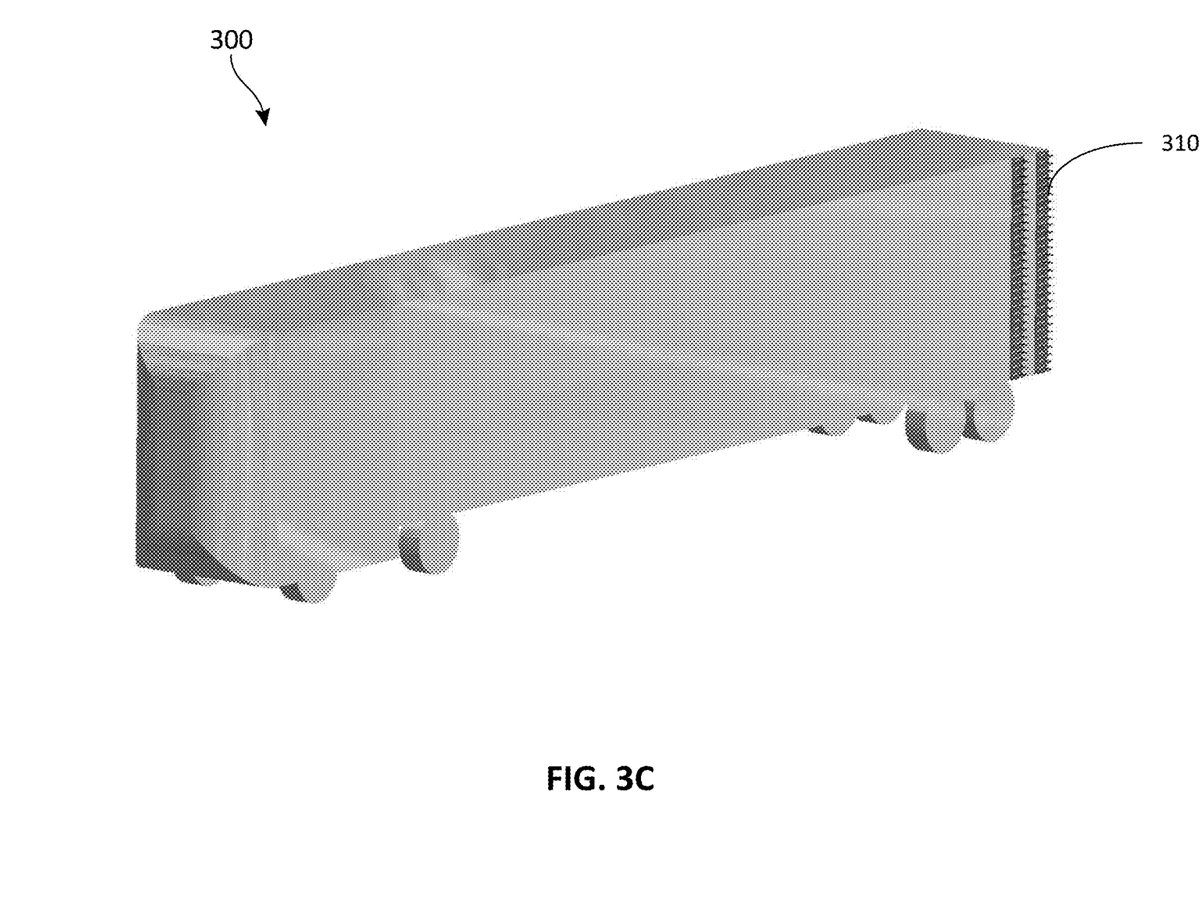
FIG. 3C depicts an example of bluff bodied ground vehicle to which two rows of aero gliding devices for improving aerodynamic drag have been attached.
Figure 3D:
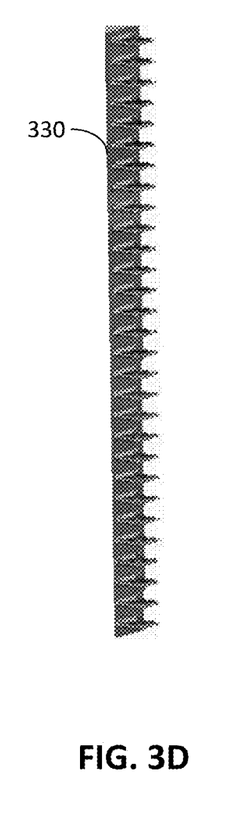
FIG. 3D depicts an example of a strip to which aero gliding devices for improving aerodynamic drag have been attached.

In some implementations, the Aero Glider devices disclosed herein may be wider in the center and/or tapered on either one or both sides so that the body of the device creates minimal turbulence in the wake at the rear face of the vehicle. The Aero Glider devices may be flat on the extended outside base of the devices. The thickness observed at the center of the devices may compress the air that passes through the pairs of neighboring devices to speed up the air and as such reduce the amount of turbulence in air. The Aero Glider devices may be mounted or manufactured individually on the surface of the vehicle or may form a connected system (e.g., a strip) that can be attached to the vehicle's surface. FIG. 3D depicts an example strip 330 to which a number of Aero Glider devices are attached. The strip may be an adhesive or magnetic strip for easy attachment to the body of the vehicle.

As will be understood by persons of skill in the art upon reading this disclosure, benefits and advantages provided by such implementations can include, but are not limited to, a solution to the problem of substantial aerodynamic drag around the rear end of the vehicle. Technical solutions and implementations provided herein provide a mechanism for reducing the amount of aerodynamic drag around the rear end of the vehicle efficiently, without substantially increasing the weight of the vehicle. Furthermore, the solutions provided herein provide an inexpensive, easy to install and easy to operate mechanism that does not hinder the operational performance of the vehicle. The benefits made available by these solutions include increasing fuel or energy efficiency at an affordable cost, and thus providing environmental and cost-saving benefits.

The present disclosure should be considered as illustrative and not restrictive in character. It is understood that only certain embodiments have been presented and that all changes, modifications, and further applications that come within the spirit of the disclosure are desired to be protected. It should be noted that, while a truck may be used as an example vehicle in this disclosure, the scope of the present disclosure is not limited to heavy-weight trucks and is applicable for all modes of ground transportation vehicles to reduce the drag of all existing and future ground vehicles (e.g. cars with trailers, tractor-trailer trucks, trains, buses, etc.). The placement of the devices disclosed herein may be adapted to the geometry of the vehicle.

Typically, ground transportation vehicles have one of a few general configurations. These include being blunt bluff bodied, being rounded bodied, or having cylindrical rear ends. Bluff bodied vehicles often experience a significant amount of drag. When a forward moving vehicle meets air resistance, there is an impact to the front face of the vehicle, pushing backwards on it and causing the air streams to spread around the bluff body. As a result, this spread causes flow separation, leading to a massive, slow-moving air pocket at the rear of the vehicle along with unsteady turbulence. This pocket of air, otherwise known as the wake, features a pressure difference that exerts a pulling force on the rear of the vehicle. Together, the push at the front and the pull at the rear results in added pressures counter to the intended direction of the vehicle. This drag pressure necessitates the need for more power from the vehicle. Additionally, the unstable turbulence caused by flow separation leads to the vehicle shaking and therefore, deteriorating the vehicle's stability.

For cylindrical trailer bodies (e.g., oil-tank cars of trains, tanker trailers, non-dry goods trailers, cylindrical train cars and the like), as air flows towards the beveled rear face of the trailer, the rounded transition keeps the air streams from separating as much as it does with the bluff bodied vehicles. It should be noted that cylindrical trailer bodies include trailer bodies that are oval shaped, flat on one or more sides or have tapered sides. The effect of the rounded or tapered transition on keeping the air streams from separating means that the amount of wake is smaller than that experienced by bluff bodied vehicles. While the amount of drag on cylindrical bodied vehicles may be less than that of other types of vehicles, the Aero Glider devices disclosed herein can also reduce the amount of drag on such cylindrical trailer bodied vehicles. For such cylindrical bodied vehicles, the mechanism provided herein may lead to faster and more uniform streams at the rounded transition points, thus resulting in a more laminar flow all around the rear of the vehicle. This results in a reduction in turbulence in the rear wake, as there is still a vortex shedding effect in the wake area with uneven pressures and air speeds.

Figure 1A:
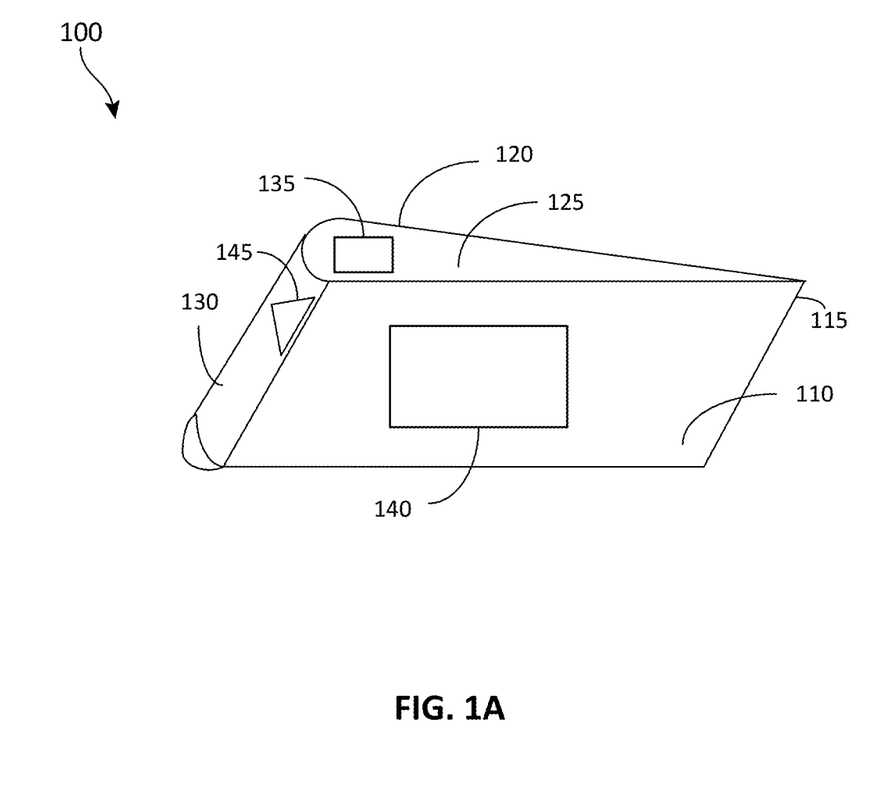
FIGS. 1A-1B show examples of one implementation of devices for reducing aerodynamic drag of a ground transportation vehicle, upon which aspects of this disclosure may be implemented.
Figure 1B:
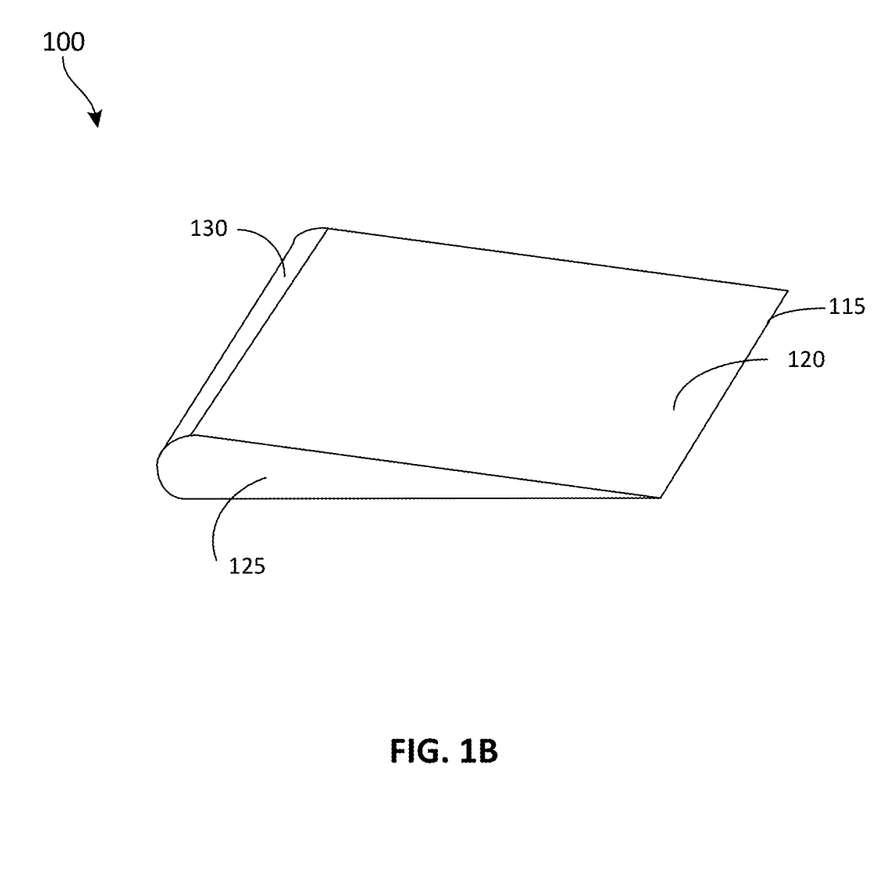

FIGS. 1A-1B illustrate examples of one implementation of Aero Glider devices for reducing the amount of aerodynamic drag on a ground transportation vehicle. FIG. 1A depicts a side view of an example one side-tapered Aero Gilder device 100. The Aero Glider device 100 includes a flat rigid first surface 110 to which a tapered second surface 120 is attached. One side of the tapered surface 120 meets the flat rigid surface 110 to create a sharp edge 115 on one side, while the other side of the tapered surface 120 is attached to the flat surface via a top transition component 130 having a rounded edge. In some implementations, the rounded edge has a unique radius. The tapered surface 120 results in two tapered side surfaces 125.

FIG. 1B depicts a top view of the example one side-tapered Aero Gilder device 100. As depicted, the Aero Glider device 100 is wider in the center and thinner on one side so that when attached near the rear end of a vehicle in plurality, the devices can result in reduced turbulence in wake at the rear face of the vehicle. In an example, the Aero Gilder device 100 is attached to the body of the vehicle via one of the tapered side surfaces 125 such that the flat side surface 125 meets the surface of the body of the vehicle. When multiple Aero Gilder devices 100 are attached to the vehicle in proximity to each other, the thicknesses observed at the center of the Aero Gilder devices may compress the air that passes through the pairs of neighboring Aero Gilder devices to speed up the air, thus minimizing turbulence in air flow.

Figure 2:
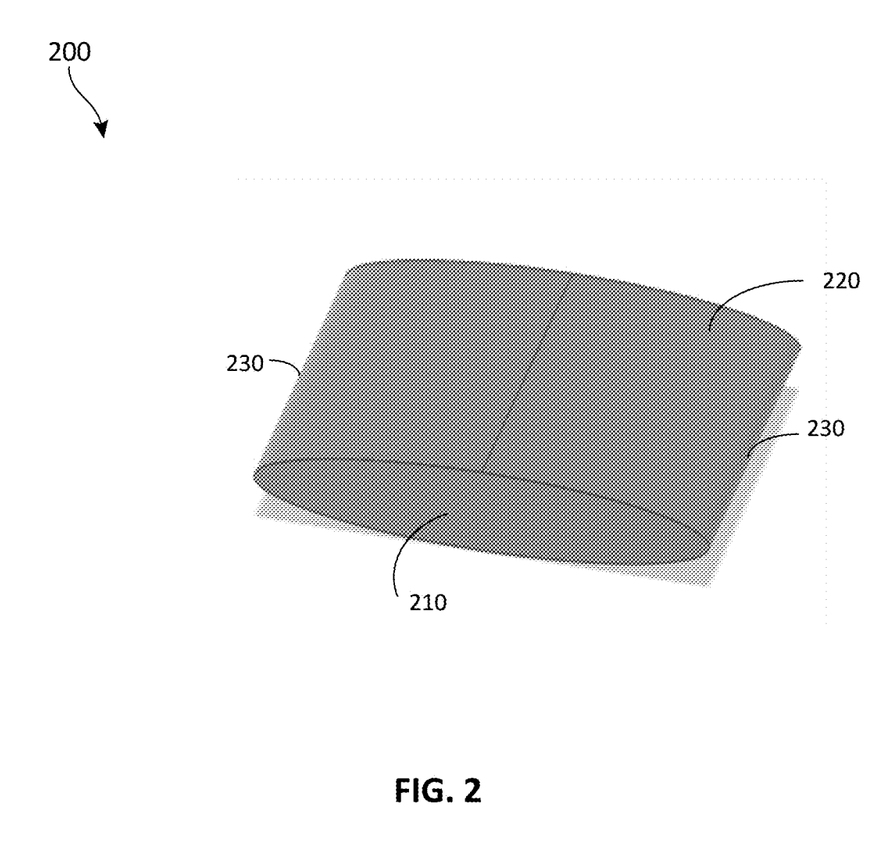
FIG. 2 depicts an example of another implementation of devices for reducing aerodynamic drag of a ground transportation vehicle, upon which aspects of this disclosure may be implemented.

FIG. 2 depicts a two side-tapered Aero Gilder device 200 implementing principles taught herein. The device 200 includes two flat surfaces 210 that are attached to a tapered surface 220 on the top and a tapered surface 220 on the bottom. The tapered surfaces 220 are centrally thicker and thinner at the ends 230 of the device. As a result, the device 200 is wider in the middle and thinner on the sides 230. The device 200 may be attached to the body of the vehicle via one of the flat surfaces 210. Similar to the device 100 of FIG. 1A-1B, the device of 200, when attached in groups of two or more to the rear area of a vehicle, can result in reduced turbulence in wake, and as such reduce aerodynamic drag in the rear area of the vehicle. Thus, in one implementation, devices used for reducing aerodynamic drag in the rear area of the vehicle include a device having tapered frontal and/or rear faces as to minimize separation flow. This includes a multiplicity of adjacent, organized rigid surfaces that are attached to the lateral or vertical exterior surfaces of a ground vehicle.

The Aero Glider devices may be mounted to or manufactured on the exterior body of the vehicle or affixed to existing aerodynamic attachments on the vehicle. In one implementation, the Aero Glider devices are affixed to the body of the vehicle as individual devices on the surfaces of the trailer body or as a system with a multiplicity of devices connected to one another on the surface of the trailer body. Both singular devices and systems may be mounted in a rigid manner or may be dynamic to fold for ease of storage, and ease of opening doors so that the devices maintain a low profile for regular operational actions to be undisturbed. Whether mounted individually or as a system, each of the Aero Glider devices may be positioned at the rear area of the vehicle and extending outwards from the vehicle. The Aero Glider devices may be positioned such that at least some of the devices are parallel to each other. Attachment combinations may depend on the geometry of the vehicle.

In some implementations, one or more of the Aero Glider devices may include environmental sensors. These sensors may include moisture, wind speed and other types of environmental sensors that can be positioned in a hollow area within the Aero Glider devices for collecting data. FIG. 1A depicts an example environment sensor 135, which is placed in a hollow area within the Aero Glide device 100. For In an example, one of the Aero Glider devices installed on a vehicle may include a plurality of environmental sensors and a mechanism for wirelessly transmitting collected data to either a device inside the vehicle or via a wireless network to a remote server. An example of a communication element 145 for wirelessly transmitting collected data is displayed in FIG. 1A. To provide power to the environmental sensors, one or more solar panels may be installed on an external surface of the Aero Glider device. In an example, a solar panel such as the solar panel 140 of FIG. 1A may be attached to the flat surface of the device. In some implementations, two or more Aero Glider devices may be electrically connected to each other (e.g., via a wire) and a battery pack may be attached to one or more of the connected Aero Glider devices for storing energy. In some implementations, one or more of the Aero Glider devices are made from sustainable materials such as biodegradable material.

For bluff-based ground vehicles, the mechanisms discussed herein may include Aero Glider devices affixed to the lateral and/or vertical rear sides of ground vehicles. FIGS. 3A-3B depict examples of bluff-based ground vehicles to which aero gliding devices for improving aerodynamic drag have been attached. FIG. 3A depicts a heavy-weight truck 300 with mounted or manufactured Aero Glider devices 310, while FIG. 3B depicts a cargo container 350 on a truck trailer bed with mounted Aero Glider devices 320. In an example, for ground vehicles with blunt rear ends, the devices may be attached to the rear sides of the vehicle, as depicted in FIGS. 3A-3B. In some implementations, the devices may be attached close to the rear edges of the body. They may be attached to one or two of the lateral sides. In some implementations, the devices may also be attached to the top side (not shown). Although FIGS. 3A-3B show a single row of devices, multiple rows may be attached. FIG. 3C depicts multiple rows being attached to the body of the vehicle. Additional rows may further reduce the amount of drag in the rear of the vehicle. For bluff bodied vehicles such as vehicles 300 and 350, once the Aero Glider devices are installed, they may cause the air to pass between adjacent pairs of devices, thus compressing and speeding up the air. As a result, the air may travel in straight, uniform paths as it moves past the rear end of the ground vehicle.

Depending on the physical geometry of the vehicle, the orientation of the devices may be used to direct the air streams behind the vehicle to curl back into the rear face of the vehicle, to reduce rear vortices and reduce the vacuum effect of the force of the wake at the rear circulation zone. As air passes between adjacent pairs of devices along the sides, the air travels faster, longer, and straighter than it otherwise would, before turning inward to the vacuum behind the vehicle. This allows for the air under the vehicle to enter the vacuum area behind the vehicle earlier, causing it to curl back towards the rear face of the vehicle. As a result, the air may make contact with the rear face of the vehicle with a greater force than it otherwise would, thus propelling the vehicle forward with greater force. This can reduce the amount of fuel required to move the vehicle forward.

Figure 4A:
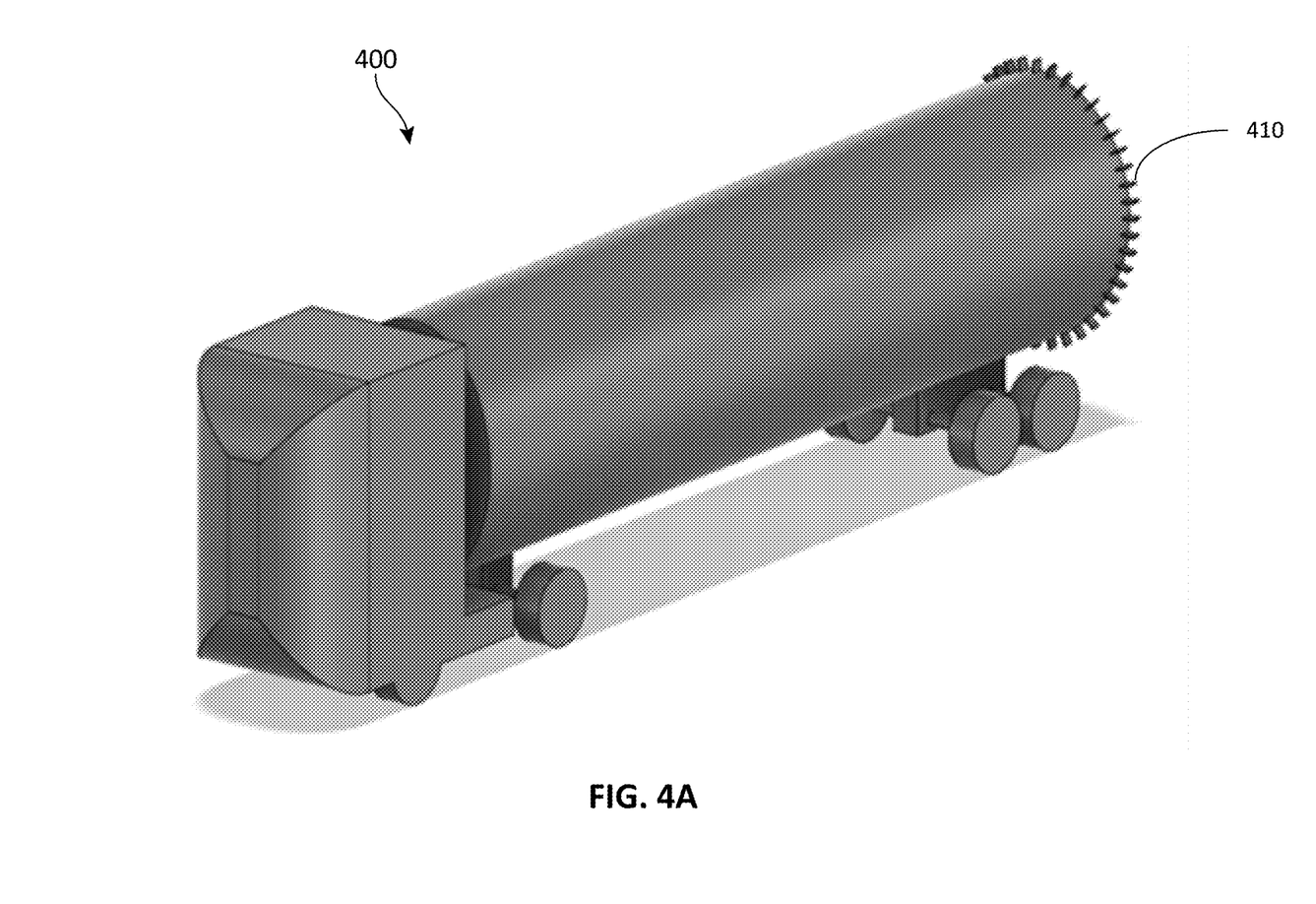
FIG. 4A-4B depict examples of cylindrically shaped ground vehicles to which devices for improving aerodynamic drag have been attached.
Figure 4B:
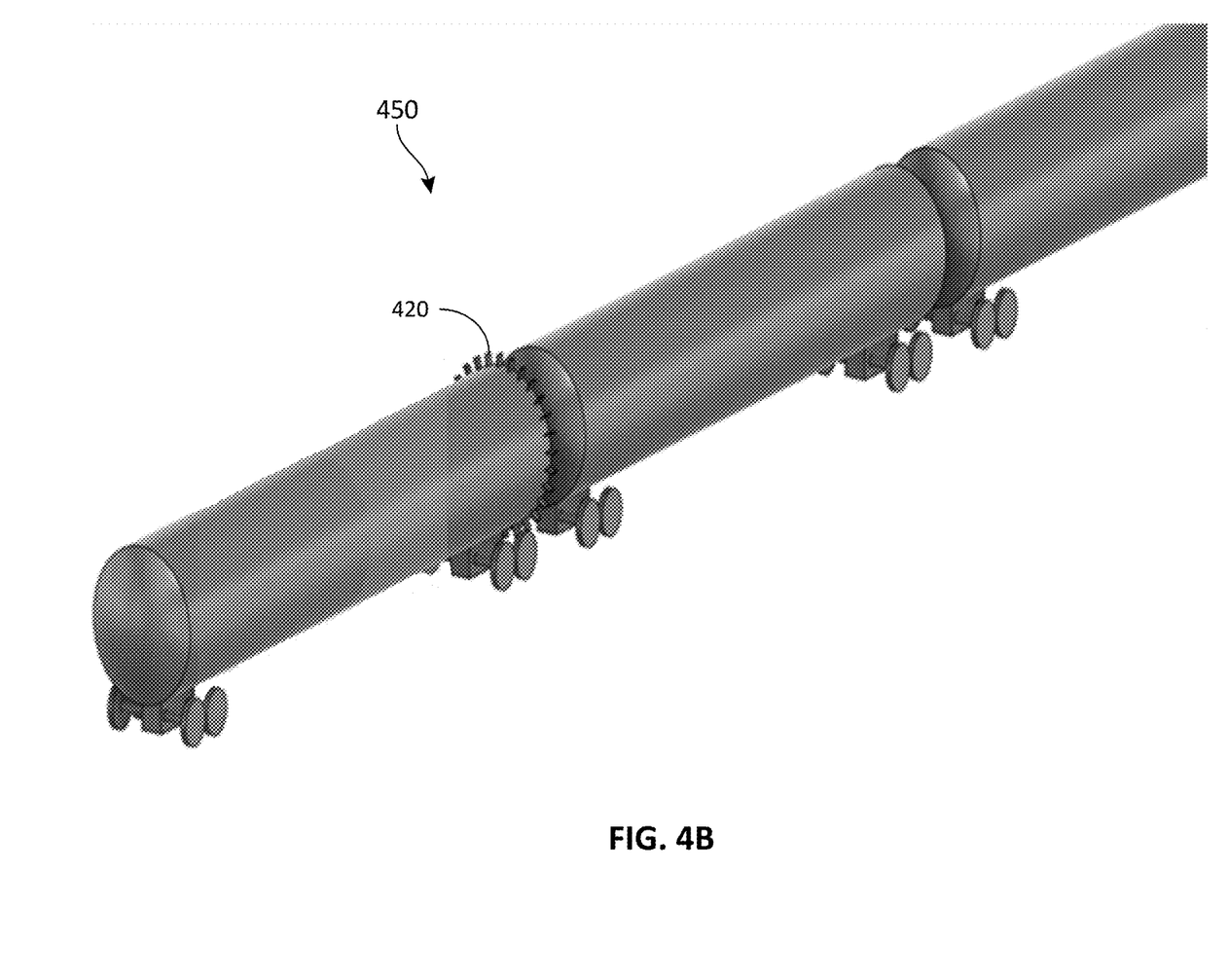

FIG. 4A-4B depict examples of cylindrically shaped ground vehicles to which Aero Glider devices for improving aerodynamic drag have been attached. FIG. 4A depicts Aero Glider devices 410 mounted on a cylindrical tanker 400, while FIG. 4B depicts Aero Glider devices 420 mounted on cylindrically shaped train containers 450. As depicted, for cylindrically shaped vehicles such as cylindrical tanker 400 and train containers 450, the Aero Glider devices may be attached along the rear lateral circumference of the vehicle. In some implementations, the Aero Glider devices are attached around the circumference. In alternative implementations, the Aero Glider devices are attached to only one or more portions of the circumference, less than the entirety of the circumference. For example, if any part of the rear circumference is obstructed, Aero Glider devices may not be attached to these parts. The resulting configuration may still reduce aerodynamic drag in the rear of the vehicle.

For caravans or platoons (multiple trailers or multiple bodies such as train cars like the one depicted in FIG. 4B), the Aero Glider devices may be attached to the rear of any or all trailers. When attached to the end of any leading trailer or train car, the Aero Glider devices may cause the air to reach the face of the next body more uniformly, thus greatly reducing the aerodynamic drag created by the gap between the bodies, as well as by the front of the subsequent body, itself.

The use of the Aero Glider devices on rounded or cylindrically shaped vehicles may be particularly effective in reducing aerodynamic drag as these types of vehicles often carry a very large wake behind their main body that extends along the complete diameter of the vehicle and tapers very far back behind the vehicle. There is also a smaller wake created by the wheels of the vehicle in which the smaller wake connects to and elongates the main wake. Because of this, only a small stream of air recirculates from under the vehicle body and curls upwards back towards the rear face of the vehicle.

When the Aero Glider devices are mounted at the rear perimeter of the vehicle base, the air speeds up around the outside perimeter of the wake, causing the wake boundaries to become smaller in both height and width. The Aero Glider devices also cause the air underneath the vehicle to move faster so that the main wake behind the vehicle disconnects from the smaller one behind the wheels. This greatly reduces the wake size created in the lower region by the wheels and creates a fast-moving river of air that travels up from underneath the vehicle's axel between the two wakes, back towards the trailer body rear of the vehicle, allowing for a greater assistive push forward on the vehicle. Lastly, the mounted Aero Glider devices eliminate the slowdown from the force of drag along the surface of the cylindrical or rounded vehicle. As air passes between the adjacent pairs of attachments along the rear circumference, the air stream travels faster, longer, and straighter than it otherwise would before turning inward to the vacuum behind the vehicle. This reduces random eddies and increases the uniformity of the airflow surrounding the rear of the vehicle and the vacuum area behind the vehicle. This also reduces the rearward force against the ground vehicle, thus improving its aerodynamic profile and efficiency.

Vehicles having bluff base bodies with the Aero Glider devices mounted along the rear lateral sides demonstrate a similar effect to that of the rounded or cylindrically shaped bodied vehicles. When the Aero Glider devices are attached to both sides of the bluff base vehicle body, they cause a reduction in the wake behind the vehicle. The Aero Glider devices cause the air along the rear sides of the vehicle to speed up as the air passes beyond the bluff base, thereby causing the air streams to extend further past the vehicle than they normally would before turning inwards toward the wake. As the air streams flowing below the vehicle exit past the bluff base, they turn upwards and circulate back towards the rear end of the bluff base sooner than they otherwise would. These air streams reach the bluff base in a more direct path and at a more perpendicular angle relative to the rear end of the vehicle than they otherwise would without the use of Aero Glider devices.

The Aero Glider devices which can be mounted or manufactured on the rear perimeter of bluff base, rounded, or cylindrical vehicles, allow for streams of air to flow from outside of the boundary layer and flow back in the direction normal to the surface of the rear of the vehicle. The geometry of the Aero Glider device is such that the boundary layer flow of air remains laminar around the Aero Glider device. The geometry creates an effect whereby the surrounding air streams speed up, reducing the formation of transitional air flow and turbulent eddies that typically form in the wake of the vehicle. The geometry of the Aero Glider devices may further reduce the wake size, lower air pressure, and decrease high drag which is associated with eddies and turbulence occurring behind the vehicle. Furthermore, the geometry of the Aero Glider devices may allow for uniform flow of air due to tapered ends and wider centers which minimize the turbulence at the boundary layer. As a result, in both cases where cross wind exists or where there is unmoving air, the Aero Glider devices may reduce the aerodynamic drag. In the case of cross winds, the Aero Glider devices may still be able to speed up the airflow on at least one side of the vehicle, allowing for the air underneath the vehicle to circulate upwards and towards the rear of the vehicle, resulting in an assistive push on the vehicle.

Thus, the present disclosure provides a mechanism for minimizing and/or stabilizing the amount of turbulent wake created behind a ground vehicle as a result of air detaching from the rear sides of the vehicle's body. This goal is achieved by mounting Aero Glider devices as a configuration of multiple devices or a system of devices where the placement of the neighboring devices directs the air streams to pass between adjacent pairs of devices, in which the oncoming air compresses and speeds up. This air travels in straight, uniform paths as it moves past the rear of the ground vehicle. Depending on the physical geometry of the vehicle, the orientation of the Aero Glider devices may be used to direct the air streams behind the vehicle. As a result, the air that does not pass through the Aero Glider devices curls backwards to provide an assistive push to the vehicle. This effect reduces the rear vortices and reduces the backward suction force of the rear circulation zone, thus reducing the amount of aerodynamic drag and as a result improving fuel efficiency.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for reducing an amount of aerodynamic drag generated within a rear area of a vehicle, comprising:
   attaching a plurality of devices to a surface of the vehicle, the plurality of devices being positioned such that at least two of the plurality of devices are parallel to each other,
   wherein:
      each of the plurality of devices includes a plurality of flat surfaces and a tapered surface,
      the plurality of devices are attached to the vehicle via one of the plurality of flat surfaces being attached to the surface of the vehicle;
      the plurality of devices are positioned in the rear area of the vehicle, and
      the at least two of the plurality of devices cause an air stream passing between the at least two of the plurality of devices to compress and increase in speed before the air stream is turned inward to a vacuum formed behind the vehicle.

2. The method of claim 1, wherein the vehicle is cylindrically shaped, and the plurality of devices are positioned along at least a portion of a rear lateral circumference of the vehicle.

3. The method of claim 1, wherein the vehicle is a bluff bodied ground vehicle, and the plurality of devices are positioned along one or more sides of the vehicle in the rear area of the vehicle.

4. The method of claim 1, wherein the plurality of devices are attached in a single row.

5. The method of claim 1, wherein the plurality of devices are attached in a plurality of rows.

6. The method of claim 1, wherein the plurality of devices are connected to an adhesive or magnetic strip attached to the surface of the vehicle.

7. The method of claim 1, wherein at least one of the plurality of devices include an environmental sensor.

8. The method of claim 7, wherein at least one of the plurality of devices may include a solar panel for providing energy to the environmental sensor.

9. A system for reducing an amount of aerodynamic drag generated within a rear area of a vehicle, comprising:
   a plurality of devices for attaching to or manufacturing on a surface of the vehicle, each of the plurality of devices comprising a plurality of flat surfaces and a tapered surface, the plurality of flat surfaces being connected to the tapered surface via a rounded transition element, and the plurality of devices are positioned such that at least two of the plurality of devices are parallel to one another, wherein:
- the plurality of devices are manufactured on or attached to the vehicle via one of the plurality of flat surfaces being attached to the surface of the vehicle;
- the plurality of devices are positioned in the rear area of the vehicle, and
- the at least two of the plurality of devices cause an air stream passing between the at least two of the plurality of devices to compress and increase in speed before the air stream is turned inward to a vacuum formed behind the vehicle.

10. The system of claim 9, wherein at least one of the plurality of devices includes one-sided tapered surfaces or dual-sided tapered surfaces that are centrally thicker and thinner at one or more ends of the at least one of the plurality of devices.

11. The system of claim 9, wherein at least one of the plurality of devices includes an environmental sensor.

12. The system of claim 11, wherein at least one of the plurality of devices include a communication element for transmitting environmental data to a unit.

13. The system of claim 11, wherein at least one of the plurality of devices includes a solar panel.

14. The system of claim 9, wherein at least one of the plurality of devices is made from a sustainable material.

15. The system of claim 9, wherein the vehicle includes one or more caravans to which at least one of the plurality of devices is attached or on which at least one of the plurality of devices is manufactured.

16. The system of claim 9, wherein the vehicle includes a platoon of a plurality of vehicles and the plurality of devices are attached to or manufactured on at least one of the plurality of vehicles in the platoon.

* * * * *